(12) United States Patent
Qin et al.

(10) Patent No.: US 12,438,398 B2
(45) Date of Patent: Oct. 7, 2025

(54) ACOUSTIC WAVE-BASED FULL-SEA-DEPTH-COVERING UNDERSEA WIRELESS CHARGING METHOD AND DEVICE

(71) Applicant: BEIJING INFORMATION SCIENCE & TECHNOLOGY UNIVERSITY, Beijing (CN)

(72) Inventors: Lei Qin, Beijing (CN); Chao Zhong, Beijing (CN); Likun Wang, Beijing (CN)

(73) Assignee: BEIJING INFORMATION SCIENCE & TECHNOLOGY UNIVERSITY, Beijing (CN)

( * ) Notice: Subject to any disclaimer, the term of this patent is extended or adjusted under 35 U.S.C. 154(b) by 543 days.

(21) Appl. No.: 18/009,364

(22) PCT Filed: Dec. 4, 2020

(86) PCT No.: PCT/CN2020/133876
§ 371 (c)(1),
(2) Date: Dec. 9, 2022

(87) PCT Pub. No.: WO2022/048059
PCT Pub. Date: Mar. 10, 2022

(65) Prior Publication Data
US 2023/0223791 A1    Jul. 13, 2023

(30) Foreign Application Priority Data
Sep. 4, 2020   (CN) .......................... 202010921144.6

(51) Int. Cl.
*H02J 7/00*       (2006.01)
*B60L 53/10*     (2019.01)
(Continued)

(52) U.S. Cl.
CPC .............. *H02J 50/15* (2016.02); *B60L 53/10* (2019.02); *B63G 8/001* (2013.01); *H02J 7/32* (2013.01);
(Continued)

(58) Field of Classification Search
CPC ... H02J 50/15; H02J 7/32; B60L 53/10; B60L 2200/32; B63G 2008/008; B63G 8/001; H04R 1/44
(Continued)

(56) References Cited

U.S. PATENT DOCUMENTS 11,848,570 B1 *  12/2023  Zhou ...................... H02J 50/402
2018/0099733 A1 *  4/2018  Sato ........................ H04B 11/00

FOREIGN PATENT DOCUMENTS

CN   102709993 A   10/2012
CN   203787081 U    8/2014
(Continued)

OTHER PUBLICATIONS

First Chinese Office Action mailed Jun. 6, 2022 received in Application No. CN202010921144.6.
(Continued)

*Primary Examiner* — Zixuan Zhou
(74) *Attorney, Agent, or Firm* — Dilworth & Barrese, LLP (57) ABSTRACT

An underwater wireless charging method and device using acoustic waves for covering the entire depth of sea is disclosed. Within 10 meters below the water-level, unmanned undersea vehicles (UUV) are charged from a mother ship. Between 10 meters and 100 meters below the water-level, a sound wave is directly sent from the mother ship to the underwater sensor to be charged. At the depth of more than 100 meters below the water-level, an underwater UUV is adopted to in situ charge the underwater sensor node
(Continued)

at close range. The transmitting transducer converts electrical energy to sound energy through the inverse piezoelectric effect. The sound wave is then sent by the transducer to a hydrophone that transforms sound energy to electrical energy via the piezoelectric effect. The load can thus be charged. Three types of wireless charging can be realized by the station for different underwater application scenarios, so as to satisfy the wireless charging for covering the entire depth of sea.

10 Claims, 5 Drawing Sheets

(51) Int. Cl.
    *B63G 8/00*     (2006.01)
    *H02J 7/32*     (2006.01)
    *H02J 50/15*     (2016.01)
    *H04R 1/44*     (2006.01)

(52) U.S. Cl.
    CPC ..... *B60L 2200/32* (2013.01); *B63G 2008/008* (2013.01); *H04R 1/44* (2013.01)

(58) Field of Classification Search
    USPC .......................................... 320/108; 307/104
    See application file for complete search history.

(56) References Cited

FOREIGN PATENT DOCUMENTS

| | | |
|---|---|---|
| CN | 110391690 A | 10/2019 |
| CN | 110707791 A | 1/2020 |
| CN | 111404235 A | 7/2020 |
| WO | 2016071961 A1 | 5/2016 |

OTHER PUBLICATIONS

International Search Report mailed Apr. 26, 2021 received in Application No. PCT/CN2020/133876.

* cited by examiner

ACOUSTIC WAVE-BASED FULL-SEA-DEPTH-COVERING UNDERSEA WIRELESS CHARGING METHOD AND DEVICE

This application claims priority to International Application No. PCT/CN2020/133876 filed on Dec. 4, 2020, which claims priority to CN 202010921144.6 having a filing date of Sep. 4, 2020.

TECHNICAL FIELD

The invention relates to the technical fields of underwater wireless charging and acoustic transducers, proposing an underwater wireless charging device based on acoustic waves for covering the entire depth of ocean.

BACKGROUND OF THE INVENTION

Nowadays, with increasing ocean exploitation, various acoustic detection device emerge successively. For this purpose, unmanned undersea vehicles (UUV) and underwater sensor network nodes (such as submersible buoys) have been created for scientific research, engineering applications and military objectives. Meanwhile, the power supply of these systems has always been a major bottleneck limiting their range of use. To keep underwater facilities operating reliably, the following power supply modes have been adopted:
(1) The mode of cable power supply, ensuring the larger power supply quantity. However, it is not suitable for supply of underwater detection equipment distributed over long distances and in multiple points because of the distance limitation from shore by the arrangement of cables.
(2) The mode of built-in battery and external battery. The unit possesses large size and weight. Meanwhile, due to the limitation of water tightness, it is only suitable for use in shallow sea. In addition, the external structure would affect the underwater dynamic performance of UUV.
(3) The mode of replacing battery or charging after salvage. The main shortcoming of this mode is that it requires high manual work, while time-consuming and laborious.
(4) The mode of underwater self-powering. For example, energy can be obtained by vibrational energy harvesting or underwater chemical energy harvesting. This mode does not need long cables and can thus be adapted to all distances. However, the obtained energy is usually on the order of milliwatt, which is insufficient for underwater sensor network nodes Furthermore, the kilowatt-level energy can be obtained using wave energy harvesting systems. Nevertheless, the energy collector is large and rather expensive, which is not suitable for powering small sensors.

In recent years, underwater wireless transmission of electric power has attracted worldwide attention. This charging method is free from long electric wires and can be encapsulated independently, which can thus improve the reliability, mobility, and invisibility of underwater equipment which need to be charged in-suit. Up till now, two main ways called electromagnetic technique and ultrasonic technique have been developed for underwater wireless transmission of electric power by using electromagnetic field and sound wave as mediators to transfer energy respectively. Meanwhile, it is known that seawater has high electrical conductivity. Therefore, a high-frequency alternating magnetic field can lead to eddy current losses in seawater, which would influence the transmission efficiency. Furthermore, this way of transmitting energy via the electromagnetic field is largely limited by the operating distance. Generally, the charging distance is on millimeter level. Therefore, the accurate docking between charger and receiver should be ensured firstly in the process of underwater charging, which is rather time-consuming and high-cost. In addition, the operability of small underwater sensor network nodes is low. As a consequence, this method is only applicable to charge large equipment such as UUV using underwater large stationary charging stations with hectowatt to kilowatt power. On the contrary, the electric power supply by sound energy needs no underwater connector and can efficiently realize long-distance charging. Furthermore, no complicated operation such as accurate positioning is required during charging. Therefore, power generation using sound would be the optimal solution for wireless power supply of small UUV and underwater sensor network nodes.

The greatest advantage of underwater acoustic wireless charging is the long underwater transmission distance. Compared with the electromagnetic power generation way, the sound-based charging method allows one to prevent electromagnetic interference. Furthermore, the wavelength of a sound wave is much less than that of the electromagnetic wave, resulting in better directionality of transmission and higher energy concentration during charging. As will be shown below, underwater acoustic wireless charging can be realized at a distance of 6 cm, indicating the feasibility of acoustic wireless charging. However, because of the currently low transmission power and short operating distance, there are still many technical issues to be overcome.

SUMMARY OF THE INVENTION

In view of the above-mentioned problems, the present invention offers an acoustic wave based underwater wireless charging device for covering the entire depth of sea.

The technical solution proposed in this invention is as follows.

Within 10 meters below the water-level, mother ship can charge the UUV directly. For this purpose, a transmitting transducer is installed on the mother ship, while a hydrophone is mounted on each UUV.

Between 10 meters and 100 meters below the water-level, a sound wave is directly sent to the underwater sensor node from the mother ship for charging. A transmitting transducer is installed on the mother ship, while a hydrophone is installed on the underwater sensor node.

At the depth of more than 100 meters below the water-level, an underwater UUV can be adopted to in situ charge the underwater sensor node at close range. A transmitting transducer is mounted on the UUV, while a hydrophone is installed on the underwater sensor node.

The relevant underwater wireless charging device includes transmitting transducer and hydrophone. The transmitting transducer realizes the conversion of electric energy to sound energy via the inverse piezoelectric effect, and the emitted sound wave then propagates through the water medium. The hydrophone can receive the sound wave sent by the transmitting transducer and convert sound energy to electricity through the piezoelectric effect. Then the load can thus be charged.

Furthermore, the transmitting transducer has the characteristic of a narrow beam opening angle.

The underwater acoustic transmitting transducer includes 1-1-3 type piezoelectric composite, electrode, matching layer, heat dissipation structure, and sound absorption backing. The piezoelectric composite is composed of piezoelectric phase, passive phase, and structural phase. The piezoelectric phase comprises the columnar arrays of piezoelectric material. The structural phase is presented by a rigid material frame among the piezoelectric columnar arrays. The passive phase is a flexible polymer between the piezoelectric and structural phases. Two faces of the piezoelectric composite along the thickness direction are covered with the electrode. The matching layer is fixed on one side of the piezoelectric composite, while the heat dissipation structure and sound absorption backing are on the other side. The heat dissipation structure is a rigid material frame, which is identical to that of the structural phase in the piezoelectric composite. The sound absorption backing is distributed in the heat dissipation structure.

The heat dissipation structure precisely matches the piezoelectric composite one to ensure good heat transfer.

The underwater acoustic transmitting transducer also includes the outer shell and cable. The outer shell is a metal case. The heat dissipation structure is closely connected to the metal case to provide heat transfer. The cable is connected to the electrode lead.

The piezoelectric phase is a piezoelectric ceramic or piezoelectric crystal with low loss. The passive phase is a high temperature resistant flexible polymer. The structural phase is a grid structure fabricated by mechanical processing of the material with good heat dissipation property.

The passive phase is one of polyphenylene, polyp-xylene, polyaryl ether, polyaryl ester, aromatic polyamide, polyimide, or silicone rubber.

The structural phase is a carbon fiber composite or metallic material with low density.

The matching layer has a trapezoid shape. The lower surface of each trapezoid in the matching layer corresponds to the upper surface of the columnar array in the piezoelectric composite.

The advantages of the proposed station are as follows.

An underwater wireless charging device composed of a high-frequency underwater acoustic transmitting transducer and a highly sensitive hydrophone is realized for the first time. Furthermore, three modes of wireless charging are designed to ensure uninterruptable power supply within different depths of sea. Particular attention is paid to a thorough description of energy transfer implemented by the sound-based underwater wireless charging device under consideration.

BRIEF DESCRIPTION OF THE DRAWINGS

FIG. 5 is the structural schematic diagram of 1-1-3 composite, in which (a) is the graphic model and (b) is the vertical view.

FIG. 7 is the underwater acoustic performance curve of the oriented underwater acoustic transmitting transducer, in which (a) is the emission voltage response curve of sample A, (b) is the emission voltage response curve of sample B, (c) is the sound source leve curves of samples A and B, (d) is the direction curves of samples A and B.

DETAILED DESCRIPTION OF THE INVENTION

The technical content of the present invention will be further described in detail with reference to the accompanying drawings.

Figure 1:
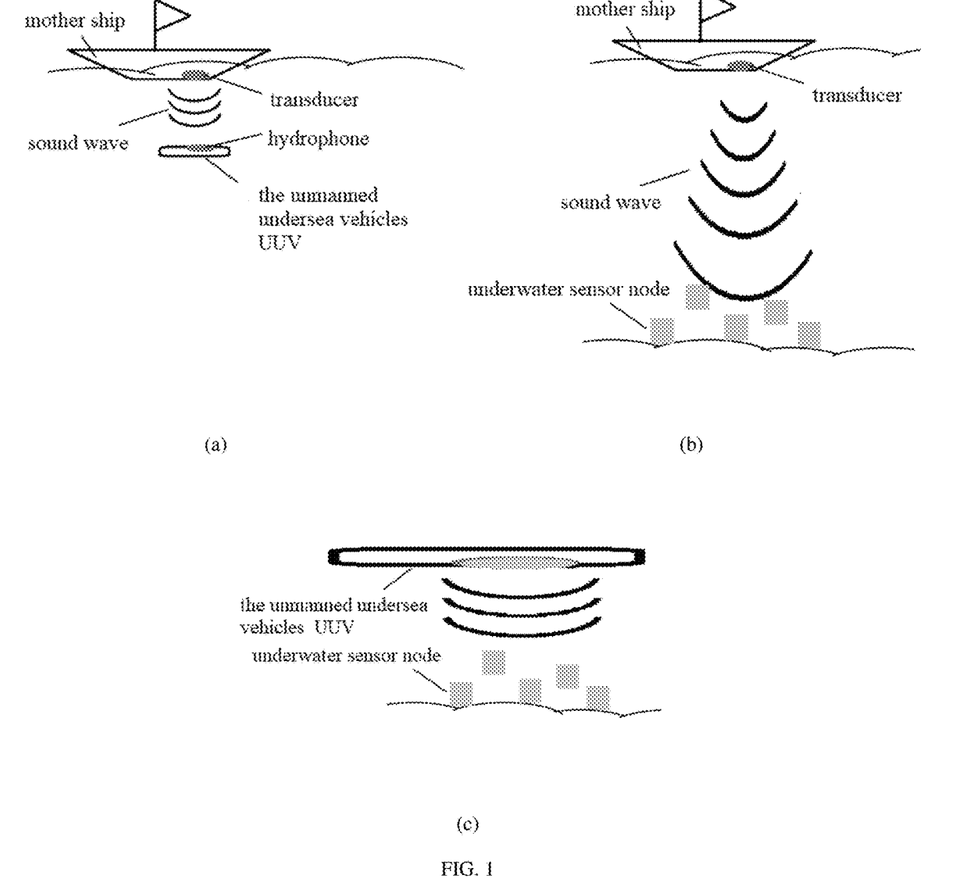
FIG. 1 is the schematic view of the underwater acoustic wireless charging device operating in three different modes.

The present invention consists in designing three types of sound-based underwater wireless charging scenarios with respect to the sea depth coverage (FIG. 1). The first type is applicable to the depth of up to 10 meters below the water-level (FIG. 1(a)). In this type, a mother ship accompanies with unmanned undersea vehicles (UUV) to charge the UUV. A transmitting transducer is mounted on the mother ship, while a hydrophone is installed on the UUV. Because the sound wave has a small opening angle and the high energy concentration at this sea depth, high power charging can be achieved. The second type is applicable to the depth range between 10 meters and 100 meters below the water-level (FIG. 1(b)). In this type, a sound wave is directly sent to the underwater sensor node from the mother ship for charging. A transmitting transducer is mounted on the mother ship, while a hydrophone is installed on the underwater sensor node. Since the spreading distance of the sound wave in water is long and the travelling wave may undergo some divergences, this type allows one to simultaneously charge several low-power underwater wireless sensor network nodes over a certain water area. The third type is applicable to the depth of more than 100 meters below the water-level (FIG. 1(c)). In this type, the UUV dives to the sea floor. The transmitting transducer is mounted on the UUV, while the hydrophone is installed on the underwater sensor node. At the depth of up to 10 meters, the underwater wireless sensor node can be in situ charged at close range. Therefore, the above three scenarios make it possible to realize wireless charging through the entire depth of sea.

Figure 2:
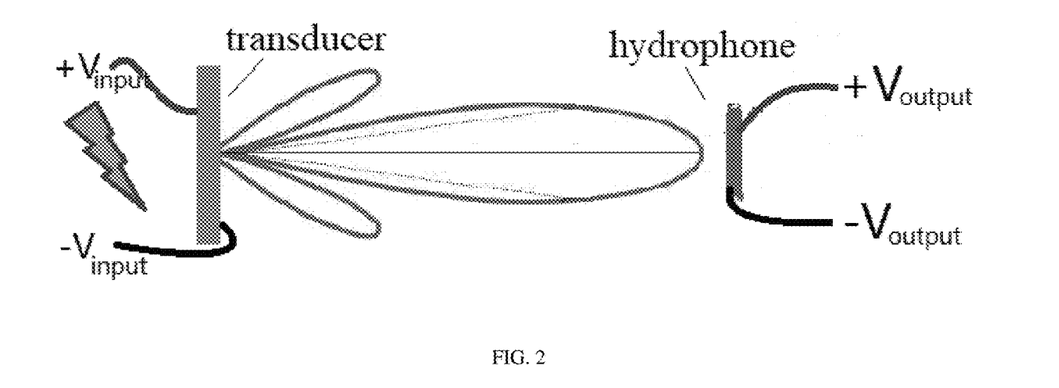
FIG. 2 is the schematic diagram of the underwater acoustic wireless charging device.

To achieve the above objectives, the proposed underwater acoustic wireless charging device includes transmitting transducer and hydrophone (see FIG. 2). The conversion of electrical energy to sound energy is implemented by the transmitting transducer via the inverse piezoelectric effect and the sound wave is then transmitted through the water medium. In this process, propagation loss and diffusion loss occur. As the sound wave arrives at the hydrophone, the sound energy is converted to electricity due to the piezoelectric effect and charge the load by matching circuit. In FIG. 2, $+V_{input}$ ($+V_{output}$) and $-V_{input}$ ($-V_{output}$) stand for the voltages generated by the positive and negative terminals of the electrical input (output) signal, respectively.

The energy transmission (FIG. 3) occurs in the above charging process as follows. One part of the input electric energy is converted by the transducer to mechanical energy via the inverse piezoelectric effect and stored in the piezoelectric material, while the other part of the electric energy is charged to the static capacitance and stored in the piezoelectric material. The inductance between the positive and negative poles can be connected to the static capacitance in the piezoelectric material to form an oscillating circuit, which can thus convert electric energy to mechanical energy. The remaining electric energy is then converted to heat. The mechanical energy is transferred to the aqueous medium through the matching layer and converted into sound energy. When the sound wave travels through water, there are scattering loss and transmission loss. Then the sound energy is transmitted to the surface of the hydrophone and transformed into electric energy via the piezoelectric effect. Finally, the received electric energy can be adjusted by matching circuit to charge load.

Figure 3:
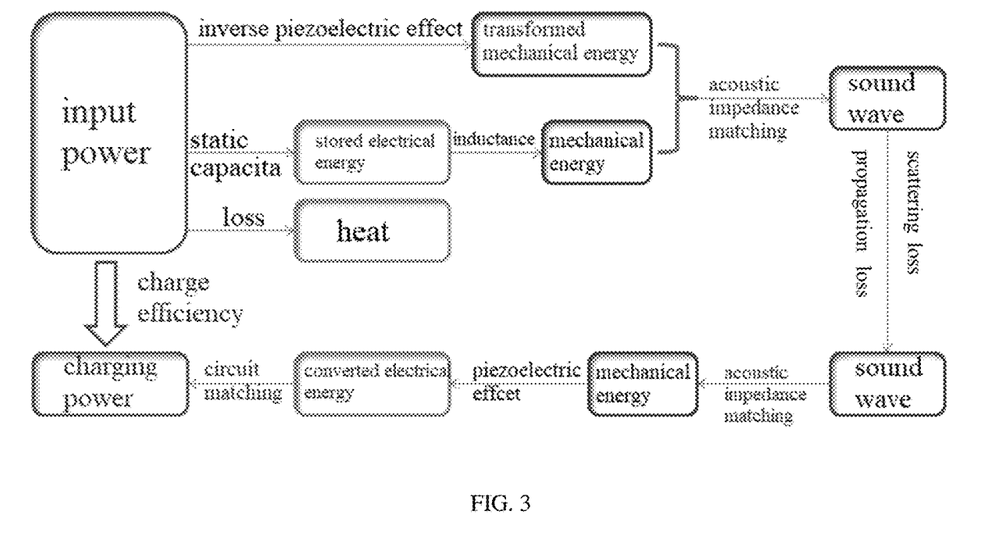
FIG. 3 is the analytical schematic view of energy transfer in the underwater acoustic wireless charging device.

In the underwater acoustic wireless charging device, one part of the input electric energy is converted by the transmitting transducer to mechanical energy via the inverse piezoelectric effect and stored in the piezoelectric material, while the other part of the electric energy is charged to the static capacitance in the piezoelectric material and stored, as shown in FIG. 3. The static capacitance is then connected to the inductance between the positive and negative poles to transform electric energy into mechanical energy. The resulting mechanical energy is about 95-98% of the input electrical energy and the other 2-5% is converted to heat. The resulted mechanical energy will be transferred to the aqueous medium through the matching layer. In the case of optimal matching, up to 100% of the vibration energy can be transferred. The propagation of sound energy through water is accompanied by scattering loss and transmission loss. Transmission loss is related to the sound frequency and transmission distance. The higher the frequency of the sound wave, the greater the transmission loss per unit distance. In the frequency range of 50 kHz to 200 kHz, the absorption coefficient of the acoustic wave in seawater increases from 0.01 dB/m to 0.105 dB/m. Therefore, the acoustic loss at the depth of up to 10 m can be controlled at about 1 dB. That means 90% of the sound energy can reach the hydrophone. The scattering loss of the sound wave depends on the beam angle. When the beam angle of the transducer at-3 dB is 180°, the energy is dispersive. If the receiving transducer (hydrophone) only occupies 10° area of the radiation field, the received energy is only $1/18^2$ of the sound energy emitted by sound sources. If the beam opening angle of the transmitting transducer at-3 dB is 10° and the receiving transducer also occupies 10° area of the radiation field at the same distance, the received sound energy is 75%-90% of the radiation sound energy. Ultimately, considering the effect of internal resistance of the receiving transducer and the maximum charging power reduced by half, the theoretical charging efficiency is about 32%-40%.

In the present invention, preference is given to the transmitting transducer with a small beam opening angle to improve the transmission efficiency of electric energy. In turn, the hydrophone or hydrophone array is used to receive sound energy and convert it into electric energy.

Figure 4:
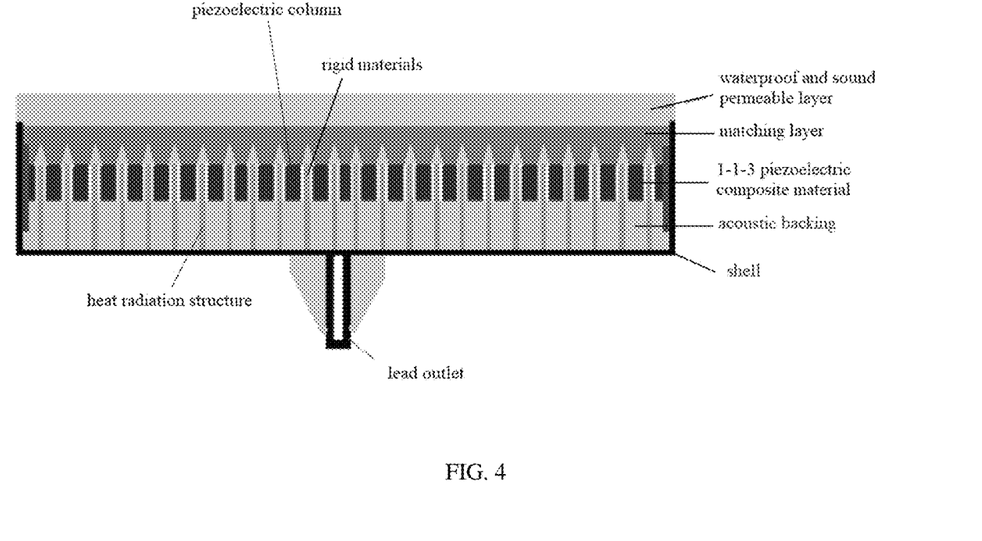
FIG. 4 is the structural schematic diagram of the high-power underwater acoustic transmitting transducer.

FIG. 4 displays an example of the transmitting transducer proposed in this invention. In particular, a piezoelectric ceramic with low loss and high-voltage resistance is used to satisfy the wireless power supply requirements of unmanned undersea vehicles and sensor network nodes. By combining 1-1-3 piezoelectric composite, transmitting transducer with high frequency, high directivity, high power, low loss and fast heat dissipation is designed. In the underwater environment, continuous power transmission can thus be achieved through the oriented sound wave propagation within a depth of 10 meters.

As shown in FIG. 4, the transmitting transducer includes 1-1-3 type piezoelectric composite, matching layer, heat dissipation structure, sound absorption backing, waterproof sound-permeable layer, and outer shell. The large-size piezoelectric composite is fabricated by cutting and filling process, providing the directional sound wave transmission from the high-power transducer. A low temperature curing silver paste is used as the electrode of piezoelectric composite, which simultaneously has high weldability and high fastness. A trapezoidal matching layer is adopted to simultaneously realize the acoustic impedance matching and displacement amplification.

Figure 5:
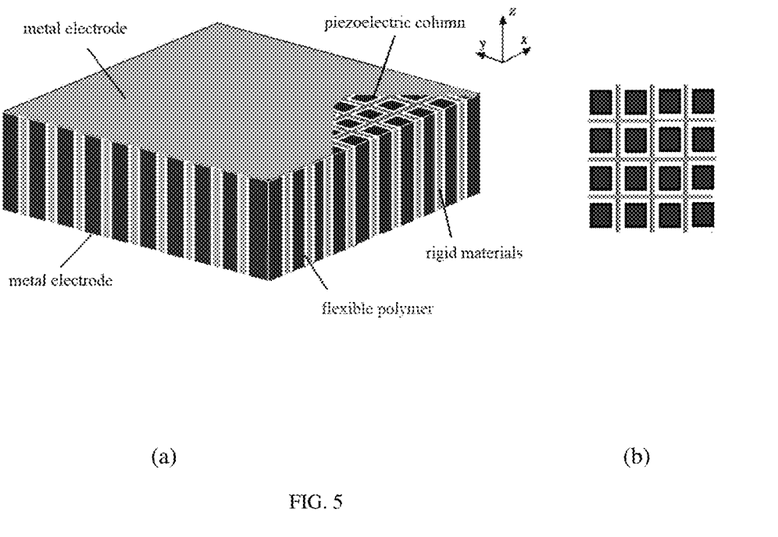

The structure of 1-1-3 type composite in the transmitting transducer is as shown in FIG. 5. A piezoelectric material column (the first phase material, also called the piezoelectric phase) has one-dimensionally connectivity along with z direction, which is surrounded with a flexible polymer layer (the second phase material or the so-called passive phase) which also has one-dimensionally connectivity along with z direction. A rigid material (the third phase or structural phase material) has three-dimensionally connectivity along with x, y and z directions to provide lateral support. The longitudinal telescopic mode of the first phase material in 1-1-3 type piezoelectric composite is utilized to realize the conversion between vibrational energy and electric energy. The second phase material in piezoelectric composite has a low Young's modulus to ensure that piezoelectric columns work in the state of approximately free vibrations for further improving energy conversion efficiency. At the same time, rubber with high thermal conductivity is selected to dissipate the heat generated by the piezoelectric column and interface quickly. The third phase material in piezoelectric composite with a high Young's modulus provides the mechanical stability of the composite. At the meanwhile, carbon fiber or low-density metallic material with high thermal conductivity is selected as the third phase material to promote further heat dissipation. Properly adjusting the proportion of a piezoelectric phase in piezoelectric composite can reduce the density of composite and acoustic impedance. Its optimal matching with water is realized through the matching layer.

The heat dissipation structure of the transmitting transducer has the same structure with the third phase material in 1-1-3 type piezoelectric composite. A mixture of epoxy resin and tungsten powder with high impedance is added to the interspace of the heat dissipation structure as a backing sound absorbing material to form acoustic backing.

As shown in FIG. 4, the transmitting transducer is fabricated as follows:
1) a complete piezoelectric ceramic block is cut into periodically arranged piezoelectric ceramic columnar arrays;
2) the prepared rigid material frame is placed among piezoelectric ceramic columnar arrays, and the gap between the frame and the piezoelectric ceramic columns is filled with a passive phase material (rubber with high thermal conductivity) for curing;
3) the upper and lower surfaces are polished to desired thickness and metal electrodes are prepared on both surfaces to form 1-1-3 type piezoelectric composite;
4) leads are weld on the surfaces of upper and lower electrodes of 1-1-3 type piezoelectric composite;
5) the lower electrode of 1-1-3 type piezoelectric composite is brought in contact with the heat dissipation structure constituted by the rigid material frame. Making the rigid material frame matched with that in 1-1-3 type piezoelectric composite;
6) the backing sound absorbing material is filled or bonded to the heat dissipation structure constituted by the rigid material frame for curing;
7) the fabricated trapezoidal matching layer is bonded to the upper electrode of 1-1-3 type piezoelectric composite so that the lower surface of each trapezoid corresponds to the upper surface of piezoelectric ceramic column;

8) the above structure is then assembled with structural component, welding lead, and watertight cable;
9) the structure is put into mold and filled with a waterproof sound-permeable layer. After solidification, the fabrication of transducer is accomplished.

The key technologies of the transmitting transducer include:

1) The heat dissipation technology of piezoelectric composite and high-power underwater acoustic transmitting transducer.

In the piezoelectric composite and high-power underwater acoustic transmitting transducer, the frame-type heat dissipation structure with excellent heat dissipation effect is introduced among piezoceramic material. On the one hand, the frame-type structure in 1-1-3 type composite is ingeniously used to simultaneously maintain its original structural support function and bring a heat dissipation function. On the other hand, the heat dissipation structure is closer to the heat source and wraps it inside, which can reduce the heat travel distance to the minimum and increase the heat transferring area for better heat dissipation.

2) The beam opening angle and sidelobe suppression technology of the high-power underwater acoustic transmitting transducer.

For 1-1-3 piezoelectric composite, the surface vibration distribution is not completely consistent. While the vibration displacement is small within the piezoelectric phase, it approaches zero in the polymer phase. Therefore, according to the principle of acoustic point source radiation superposition, the beam opening angle of the transducer can be controlled and the sidelobe fluctuation can be regulated through the sidelobe inhibition effect by adjusting the arrangement of piezoelectric elements inside the transducer. This allows the acoustic energy to be more concentrated in the main lobe to reduce energy transfer loss.

Figure 6:
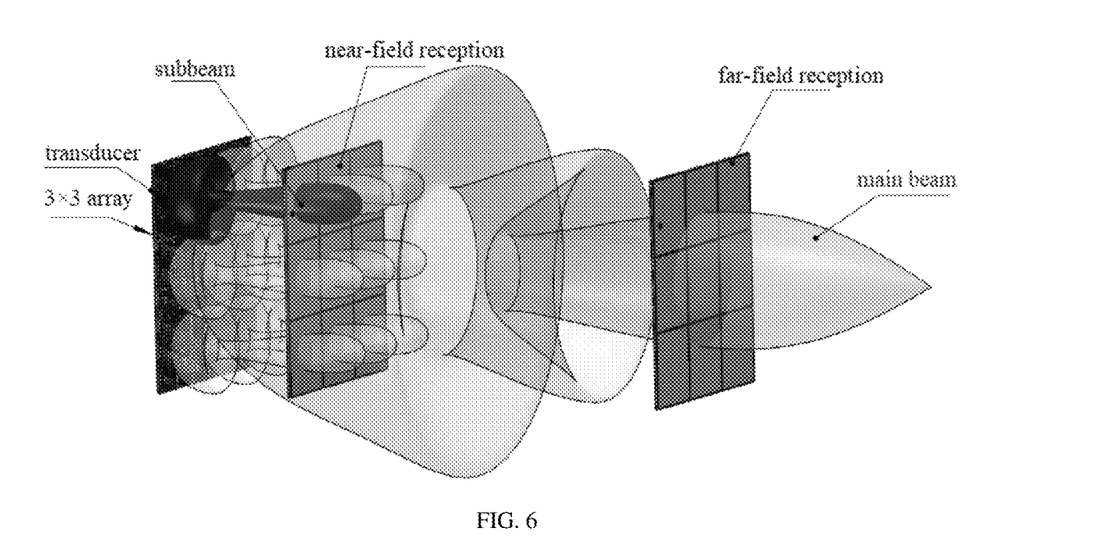
FIG. 6 is the schematic view of near-field acoustic radiation characteristics of the transmitting transducer.

The improvement of transmitting transducer power and beam opening angle control can be achieved by means of the transmitting transducer array, as shown in the left of FIG. 6. Compared with a single transmitting transducer, the transducer array has the larger radiating surface and the narrower beam opening angle. The corresponding area required for the hydrophone is smaller and the operating distance is also farther. Considering the actual working condition of underwater wireless charging, the receiving hydrophone may appear both in the far field of the transmitting transducer and in the near field. Therefore, to increase the range of charging, the size of the hydrophone should be as large as possible and can be in the form of hydrophone array. Once the hydrophone is in the near field of the transmitting transducer, it can be decomposed into multiple sub-hydrophones. The sound energy is received by a sub-hydrophone that meets the far-field condition of the sub-transmitting transducer. Therefore, in practice, multiple independent charging circuits should also be designed for the hydrophone array.

Figure 7:
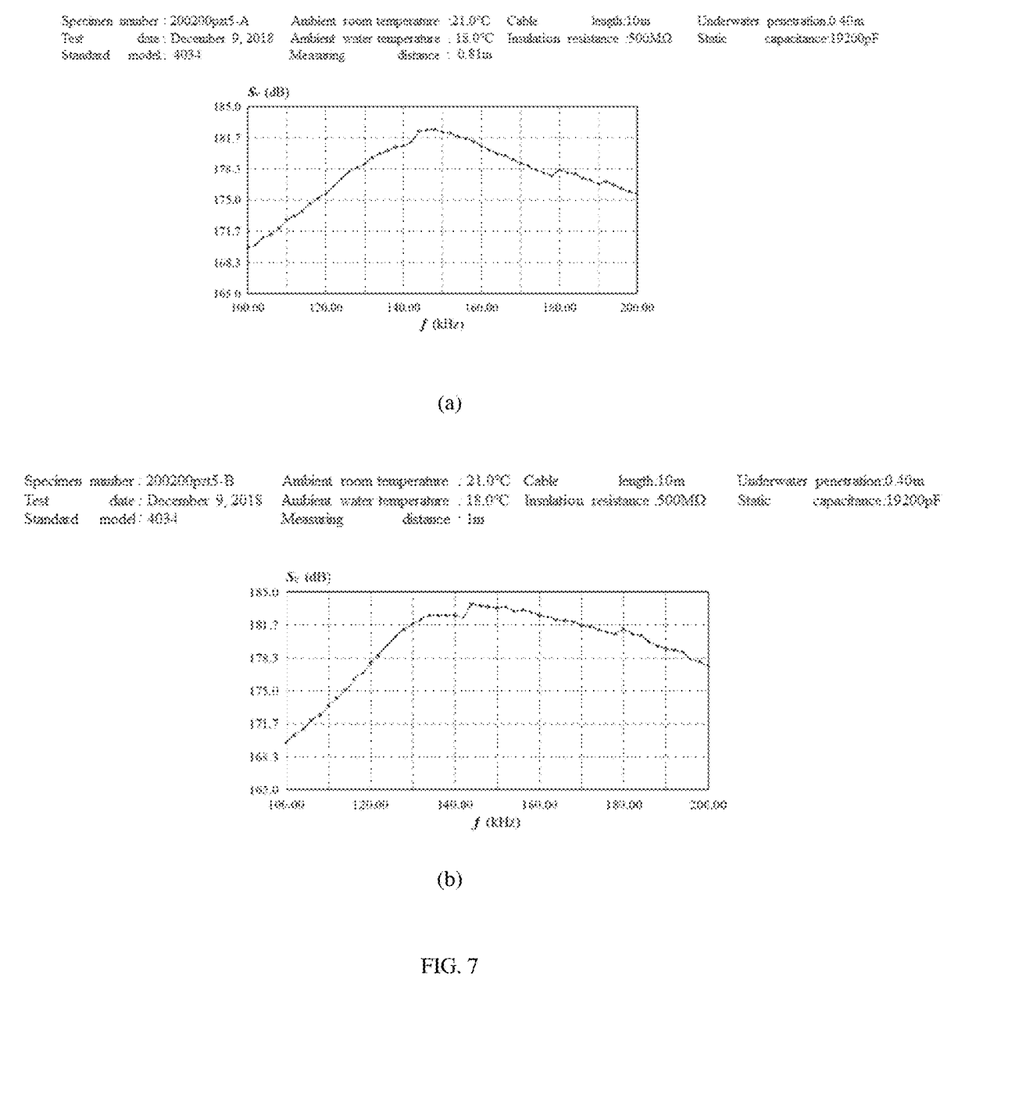

In the present invention, the above oriented underwater acoustic transmitting transducer is fabricated using a large-size piezoelectric composite. The side length of piezoelectric composite is 200 mm. The performance indicators of the transducer are shown in FIG. 7. The resonant frequency of the transducer is about 150 kHz and the maximum transmitting voltage response reaches 183.6 dB. The operating frequency range at-3 dB is 126 kHz-174 kHz and the bandwidth is as high as 48 kHz. The maximum sound source level of the transducer is 233.2 dB and the directional opening angle at-3 dB is 3°. It means that, at the charging distance of 1 m and 10 m, the arc length covered at-3 dB is 5 cm and 50 cm, respectively. The maximum sidelobe of the transducer is-23.65 dB, indicating that energy is concentrated in the main lobe.

The above disclosed embodiments and accompanying drawings are aimed at clarifying the contents of the invention, which can be understood by ordinary technicians. Without departing from the spirit and scope of the present invention, various substitutions, changes, and modifications are possible. The present invention may not be limited to the contents disclosed in the embodiments and drawings of this specification. The scope of protection may be as stated in the claims.

The invention claimed is:

1. An acoustic wave-based full-sea-depth-covering undersea wireless charging method, comprising:
   charging unmanned undersea vehicles UUV within 10 meters below the water-level from a mother ship, wherein a transmitting transducer is mounted on the mothership, a hydrophone is installed on the UUV;
   charging the unmanned undersea vehicles UUV within 10-100 meters below the water-level via a sound wave directly sent to an underwater sensor node from the mother ship, wherein the transmitting transducer is installed on the mother ship, the hydrophone is mounted on the underwater sensor node;
   charging the underwater sensor node at close range by unmanned undersea vehicles UUV in situ charge at the depth of more than 100 meters below the water-level, wherein the transmitting transducer is installed on the UUV, the hydrophone is mounted on the underwater sensor node.

2. The underwater wireless charging device adopted for the method according to claim 1, wherein the underwater wireless charging device includes transmitting transducer and hydrophone; the transmitting transducer realizes the conversion of electric energy to sound energy via the inverse piezoelectric effect, and the emitted sound wave propagates through the water medium; the hydrophone receives the sound wave sent by the transmitting transducer and convert sound energy to electricity via the piezoelectric effect.

3. The underwater wireless charging device according to claim 2, wherein the transmitting transducer has a smaller beam opening angle.

4. The underwater wireless charging device according to claim 3, wherein the transmitting transducer includes piezoelectric composite, electrode, matching layers, heat dissipation structure, and sound absorption backing; the 1-1-3 type piezoelectric composite is composed of piezoelectric phase, passive phase, and structural phase; the piezoelectric phase is made of piezoelectric material columnar arrays; the structural phase is a rigid material frame among the piezoelectric material column arrays; the passive phase is a flexible polymer between piezoelectric and structural phases; two faces of the piezoelectric composite along the thickness direction are covered with the electrode; the matching layer is on one side of the piezoelectric composite, while the heat dissipation structure and sound absorption backing are on the other side; the heat dissipation structure is the rigid material frame, which is the same with the structural phase in piezoelectric composite; the sound absorption backing is embedded in the heat dissipation structure.

5. The underwater wireless charging device according to claim 4, wherein the heat dissipation structure of the underwater wireless charging device precisely matches the material structure in piezoelectric composite to achieve good heat transfer.

6. The underwater wireless charging device according to claim 4, wherein the transmitting transducer further includes the outer shell and cable; the outer shell is a metal case; the heat dissipation structure is closely connected to the metal case to achieve good heat transfer; the cable is connected to the electrode lead.

7. The underwater wireless charging device according to claim 4, wherein the piezoelectric phase is a piezoelectric ceramic or piezoelectric crystal with low loss; the passive phase is a high temperature resistant flexible polymer; the structural phase is the grid structure fabricated by mechanical processing of the material with good heat dissipation property.

8. The underwater wireless charging device according to claim 7, wherein the passive phase is one of polyphenylene, polyp-xylene, polyaryl ether, polyaryl ester, aromatic polyamide, polyimide, or silicone rubber.

9. The underwater wireless charging device according to claim 7, wherein the structural phase is the carbon fiber composite or metallic material with low density.

10. The underwater wireless charging device according to claim 4, wherein the matching layers are trapezoidal matching layers; the lower surface of each trapezoid matching layer corresponds to the upper surface of the piezoelectric column array in piezoelectric composite.

* * * * *